Aug. 21, 1945.  F. L DEWEY  2,383,373
PLOW
Filed April 10, 1943  2 Sheets-Sheet 2

Inventor:
Frederick L. Dewey,
By Paul O. Pippel
Attorney.

Patented Aug. 21, 1945

2,383,373

UNITED STATES PATENT OFFICE 2,383,373

PLOW

Frederick L. Dewey, Canton, Ill., assignor to International Harvester Company, a corporation of New Jersey Application April 10, 1943, Serial No. 482,594

4 Claims. (Cl. 97—127)

This invention relates to agricultural implements and, more particularly, to rear furrow wheels for plows.

In the operation of plows having rear furrow wheels, it is customary, when the plow is in ground-working position, that the rear furrow wheel travel in a plane inclined from the vertical, in order that the wheel may seat itself firmly against the furrow wall made by the plow bottom. It is important, when the plow is in this position, that the furrow wheel travel in a straight line behind the plow and that it not be permitted to caster. On the other hand, when the plow is to be turned, as at the end of a field, and is raised to transport position for that purpose, it is highly desirable that the furrow wheel be permitted to caster and follow the direction of the plow, in order to prevent scraping of the wheel over the ground and consequent injury thereto. Another desirable feature of a rear furrow wheel is that it not be permitted to caster when the plow is backed up. The importance of such a feature is readily apparent when it is considered that rearward movement is generally made for the purpose of avoiding or removing obstructions encountered in plowing or for backing the plow into a shed for storage purposes or the like. In such case, it is, of course, important that rearward movement be effected in a straight line and that castering of the rear furrow wheel be prevented.

Therefore, it is an object of the present invention to provide a rear furrow wheel that will not caster upon forward or rearward movement of the plow in a straight line but will be permitted to caster when abnormal forces act against the furrow wheel, as in turning the plow.

Another object of the invention is the provision, in a rear furrow wheel which will not caster in normal operating or transport positions, of means permitting castering of the furrow wheel when the plow is turned, and means biasing the furrow wheel back to non-castering position.

Still another object is to provide a yieldable holding means for a rear furrow wheel responsive to side thrust upon the wheel to permit castering thereof when turning and operative to urge the holding means to return to holding position.

These and other objects will become apparent from the following detailed description when read in conjunction with the accompanying drawings, wherein.

Figure 1:
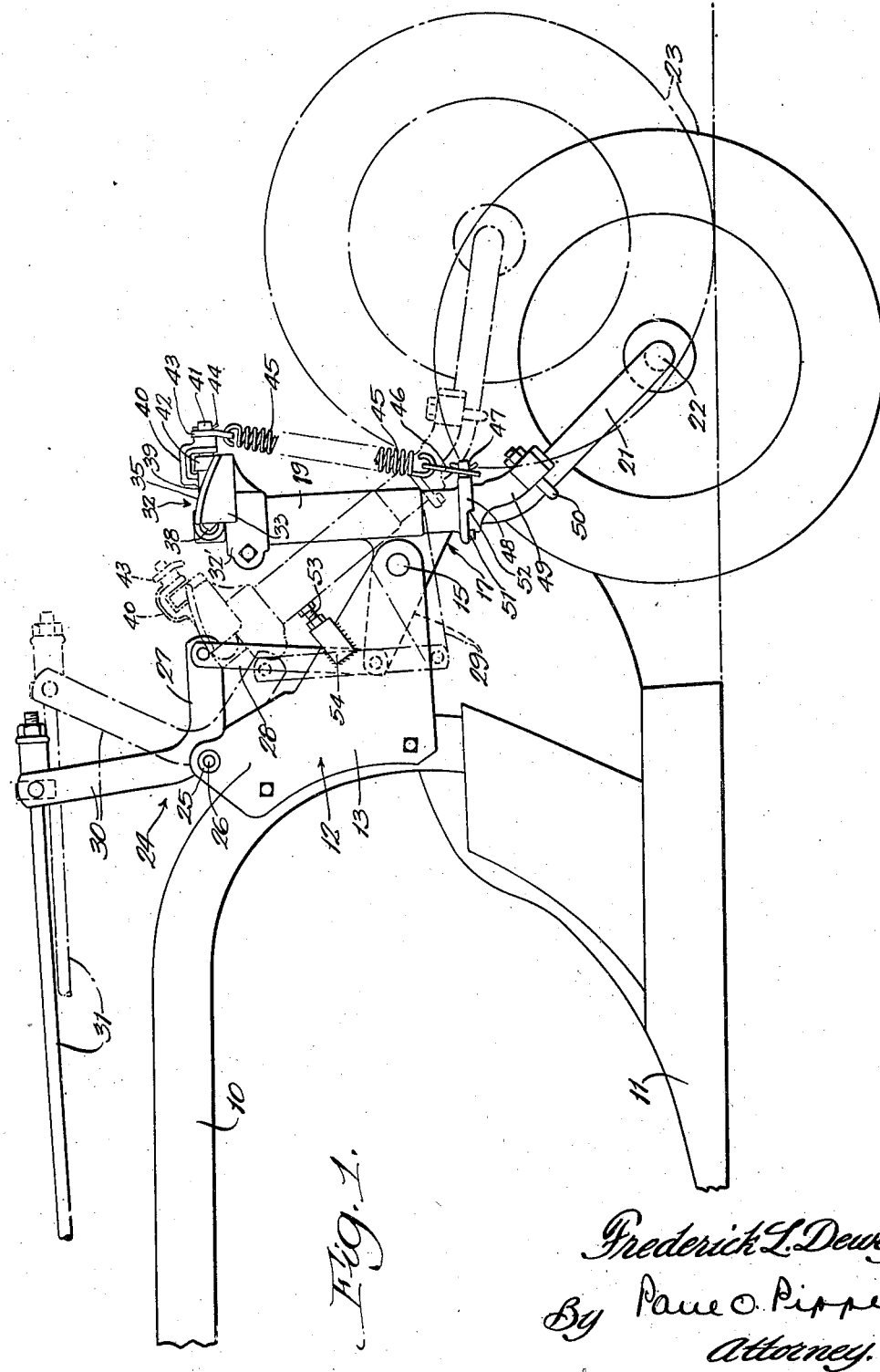
Figure 1 is a side elevation of the rear end of a moldboard plow with a rear furrow wheel embodying the features of the present invention attached thereto, the solid lines showing the position of the furrow wheel when the plow is in transport position, and the dotted lines showing its operating position.

In the drawings, the numeral 10 designates a conventional supporting frame in the form of a plow beam having one or more earth-working tools such as a plow bottom 11 attached thereto. To the rear of the plow bottom 11 is affixed a bracket 12 comprising a pair of spaced plates 13 and 14 bolted to each side of the beam and having rearwardly extending portions flared outwardly to receive therebetween a shaft 15, which extends downwardly and rearwardly from the plate 13 through an opening in the plate 14, and is held in place by a cotter pin 16 provided in the end of the shaft 15.

Figure 2:
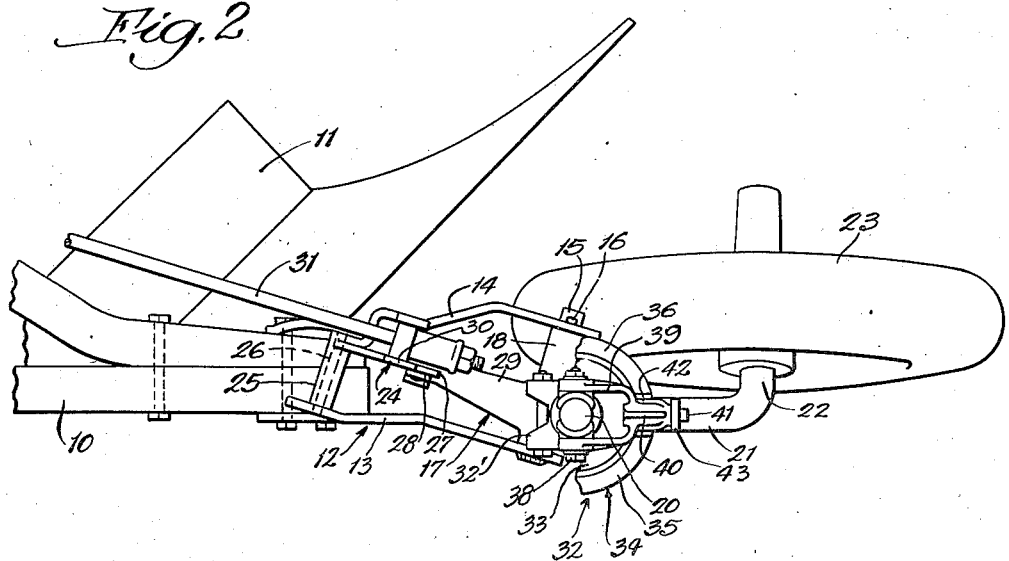
Figure 2 is a plan view of the furrow wheel shown in Figure 1.

On the shaft 15 is mounted a member 17 which comprises a bearing portion 18 and an upwardly extending sleeve 19. Bearing portion 18 journals the shaft 15, and the sleeve 19 journals an axle 20 having a rearwardly bent portion 21 which, in turn, has an outwardly and downwardly bent portion 22 upon which is journaled a rear furrow wheel 23. Furrow wheel 23 is thus angularly inclined from the vertical, as indicated in Figure 2, to permit it to become firmly seated against the land side of the furrow made by the plow bottom 11.

Member 17 is moved about its pivotal connection with shaft 15 by means of a bell-crank 24 pivoted through the intermediary of a sleeve 25 upon a bolt 26 extending between the forward ends of plates 13 and 14. A lower arm 27 of bell-crank 24 is connected by a link 28 to an arm 29 affixed to member 17. The upwardly extending arm 30 of the bell-crank has connected thereto a rod 31 which extends forwardly and is, in turn, connected to a source of power, not shown. By actuating the rod 31, the bell-crank 24 may be rocked to swing member 17 about its pivot on the shaft 15, thus changing the angular relation of the member 17 on the plow to effect vertical movement thereof. Clockwise movement of the bell-crank 24 effects lowering of the plow to operating position, as indicated in dotted lines in Figure 1, while anti-clockwise movement of the crank raises the plow to transport position.

Figure 3:
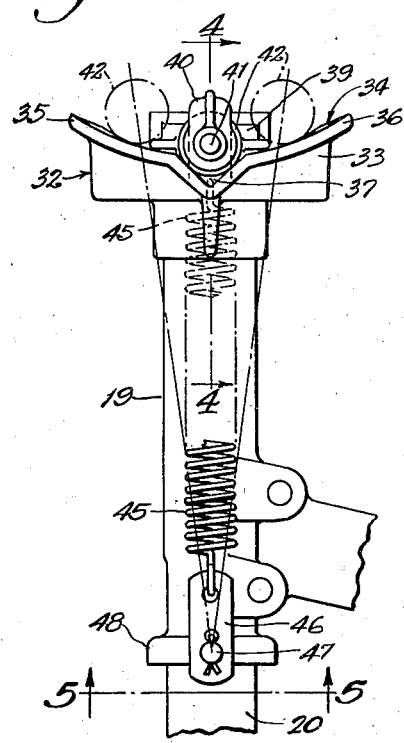
Figure 3 is a fragmentary rear elevation of a portion of the device shown in Figures 1 and 2.
Figure 4:
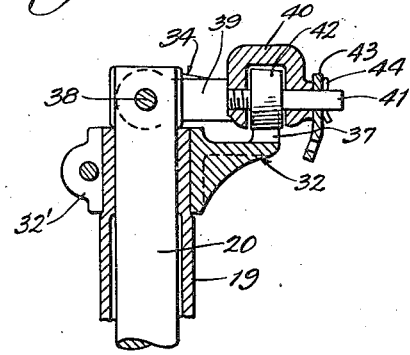
Figure 4 is a section taken on the line 4—4 of Figure 3.
Figure 5:
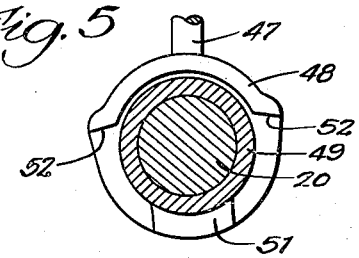
Figure 5 is a section taken on the line 5—5 of Figure 3.

As stated before, when the plow is traveling in a straight line, it is desirable that the rear furrow wheel 23 follow along in alinement therewith, and that it not be permitted to caster in either operating or transport position. This is particularly important when the plow is in transport position and it is desired to back it into a shed for storage purposes or the like, since castering of the furrow wheel would render it difficult or impossible to guide the plow. On the other hand, when the plow is moving forward in transport position and it is desired to turn the plow, as at the end of a field, it is very important that the furrow wheel be permitted to caster in order to prevent injury thereto by allowing it to scrape over the ground. Therefore, a mechanism is provided for holding the rear furrow wheel against castering, when the plow is moving in a straight line, but which will yield when lateral pressure is applied to the furrow wheel, as in turning, and permit the rear furrow wheel to caster. This holding means includes an arcuate member 32 affixed to the upper end of the sleeve 19 by a bracket 32' and provided with a semicircular base portion 33 and an upstanding rim indicated generally at 34. The rim portion 34 comprises left- and right-hand curved portions 35 and 36, respectively, having the upper edges thereof upwardly inclined. A notch 37 is provided in the rim portion 34 for a purpose hereinafter described. Pivoted upon the ends of a bolt 38 passed through the upper end of the axle 20 is a U-shaped member or arm 39 having an ear 40 apertured to receive a bolt 41, upon which is loosely mounted a roller 42 adapted to engage the notch 37 when the furrow wheel 23 is in alinement with the plow. Upon the rearwardly projecting end of the bolt 41, a lug 43 is provided and retained by a cotter-pin 44. The lug 43 has a depending portion apertured to receive one end of a spring 45. The lower end of the spring 45 is attached through the intermediary of a member 46 to an arm 47 affixed to an enlarged portion 48 on the member 17. The spring 45 exerts a downward pull upon the member 39. When lateral pressure is exerted upon the furrow wheel 23 in either direction, the axle 20 rotates in the sleeve 19, carrying the U-shaped member 39 and the upper end of spring 45 with it. The roller 42 then is forced out of the notch 37 against the action of the spring 45 and rides upwardly along the inclined edges of one of the curved portions 35 or 36, depending upon the direction in which pressure is exerted against the furrow wheel to cause it to caster. The curved portions 35 and 36 thus function as tracks upon which the roller 42 rides when forced out of the notch 37. As soon as the lateral pressure against the furrow wheel is relieved, the spring 45 forces the furrow wheel back into alinement with the plow, and roller 42 into engagement with the notch 37. The position of the roller 42 in various positions of the furrow wheel 23 is indicated in Figure 3.

Castering of the furrow wheel 23 is limited by the provision on the axle 20 of a bracket 49 attached to the axle by a U-bolt 50 and having an abutment portion 51 adapted to contact shoulders 52 on the lower surface of enlarged portion 48. When the furrow wheel is in ground-working position, as indicated in dotted lines in Figure 1, the member 17 abuts against an adjustable stop comprising a threaded bolt 53 inserted in a threaded opening in a bracket 54 affixed as by welding to plate 13. This stop member permits adjustment of furrow wheel 23 relative to plow bottom 11.

It should now be understood that a novel mechanism has been provided in a rear furrow wheel to permit castering thereof when the plow is traveling in a straight line in either operating or transport position but which will respond to side pressure against the furrow wheel to permit castering thereof.

Having now described the invention in its preferred embodiment, it should be understood that changes may be made therein without departing from the spirit of the invention or the scope of the appended claims.

What is claimed is:

1. In a plow, in combination, a frame, earth-working tools carried by the frame, a bracket mounted on the rear of the frame and including a sleeve, a member axially rotatable in said sleeve, a furrow wheel carried by said member in alinement with said earth-working tools, means yieldably holding said furrow wheel in alined position when the plow is traveling in a straight line, said holding means including an arcuate member affixed to said sleeve and having a notch, a pivotal member mounted on the end of said rotatable member and arranged to engage said notch to prevent rotation of said rotatable member, said pivotal member being arranged to ride out of said notch and move in an arc coincident with said arcuate member and in contact therewith upon movement of said furrow wheel to positions out of alinement with said working tools, a spring, means connecting one end of said spring to said bracket, and means connecting the other end of said spring to said pivotal member for movement therewith in the direction of rotation thereof with respect to said bracket, whereby said furrow wheel is resiliently urged into alinement with said working tools.

2. In a plow, in combination, a frame, a bracket mounted on the frame, a member axially rotatable in the bracket and carrying a furrow wheel, an arm pivotally mounted on said member on an axis transverse to the axis of said member and rotatable therewith, a part affixed to the bracket having a notch engageable with said arm to resist rotation of said member, a spring, means connecting one end of said spring to said bracket, and means connecting the other end of said spring to said pivotal member for movement therewith in the direction of rotation thereof with respect to said bracket, whereby said furrow wheel is resiliently urged into alinement with said working tools.

3. In a plow, in combination, a frame, a bracket mounted on the frame for pivotal movement longitudinally of the frame, a member axially rotatable in said bracket carrying a furrow wheel at its lower end and having a portion projecting from the upper end of said bracket, an arm pivotally mounted on the upper end of said member on an axis transverse thereto and rotatable therewith, a part affixed to said bracket including a semicircular track portion in guiding engagement with said arm as said member rotates, a notch in said track arranged to engage said arm to prevent rotation of said member, and resilient means connecting said arm and said bracket arranged to yield in the direction of rotation of said member and to increasingly resist rotation of said member upon displacement of said member from said notch.

4. In a plow, in combination, a frame, a bracket mounted on the frame for pivotal movement longitudinally of the frame, a member axially rotatable in said bracket carrying a furrow wheel at its lower end and having a portion projecting from the upper end of said bracket, an arm pivotally mounted on the upper end of said member on an axis transverse thereto and rotatable therewith, a part affixed to said bracket including a semicircular track portion in guiding engagement with said arm as said member rotates, a notch in said track arranged to engage said arm to prevent rotation of said member, the portions of said track on opposite sides of said notch being inclined upwardly in the direction of rotation of said member, generally vertically extending spring means, means anchoring the lower end of said spring means to said bracket, and means connecting the upper end of said spring means to said pivotal member for movement therewith in the direction of rotation with respect to said bracket, whereby said furrow wheel is resiliently urged into alinement with said working tools.

FREDERICK L. DEWEY.